(Model.)
R. WHITEHILL.
SEWING MACHINE STAND AND TREADLE.
No. 279,622. Patented June 19, 1883.
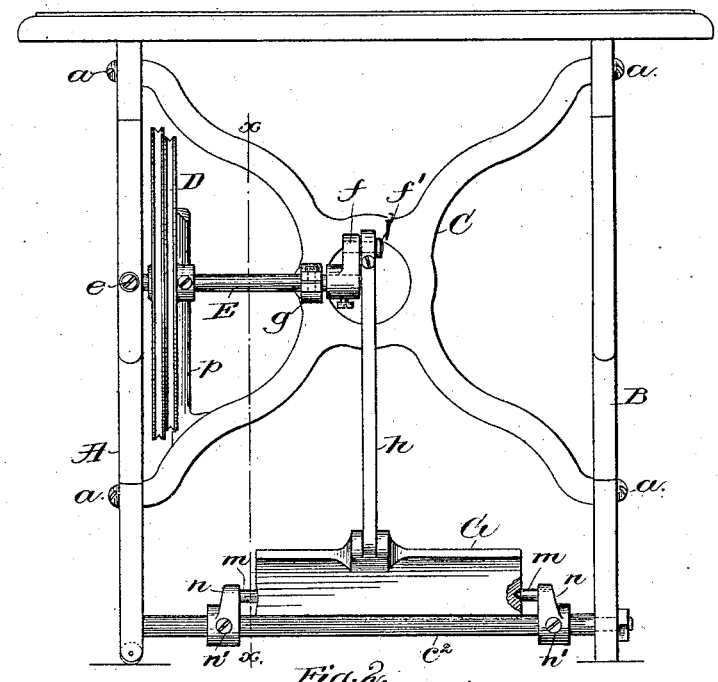
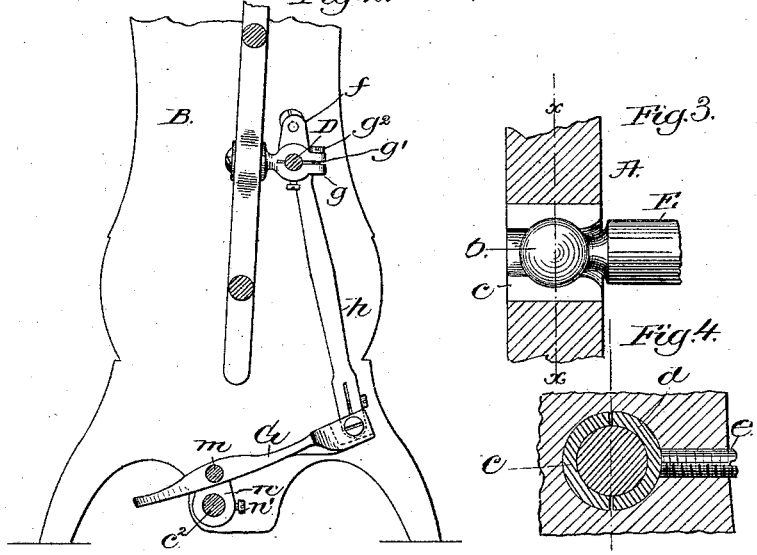
Witnesses.
John F. C. Prunkert
Fred A. Powell
Inventor:
Robert Whitehill
by Crosby & Gregory Attys.

UNITED STATES PATENT OFFICE.

ROBERT WHITEHILL, OF MILWAUKEE, WISCONSIN.

SEWING-MACHINE STAND AND TREADLE.

SPECIFICATION forming part of Letters Patent No. 279,622, dated June 19, 1883.

Application filed October 11, 1882. (Model.)

*To all whom it may concern:*

Be it known that I, ROBERT WHITEHILL, of Milwaukee, county of Milwaukee, State of Wisconsin, have invented an Improvement in Sewing-Machine Stand and Treadle, of which the following description, in connection with the accompanying drawings, is a specification.

One part of my invention consists in providing the band-wheel-carrying shaft of the stand, near one end, with a ball-like journal portion to fit a correspondingly-shaped bearing portion held in the side piece of the stand, the said bearing being preferably divided into two or more parts to permit the same to be adjusted to the journal portion to compensate for wear, the said ball-like journal and bearing permitting the shaft to run freely and steadily, even were the bearings for both ends of the said shaft out of line.

Another part of my invention consists in the combination, with the treadle of a sewing-machine and treadle-link and the said shaft having a ball-like journal portion at or near one end, of an adjustable split bearing for the other end of the said shaft, the said split bearing having its shaft-receiving opening of sufficient diameter to receive the said shaft freely, and to be thereafter tightened upon and made to fit the said shaft according to its angularity.

In the drawings, wherein like letters represent like parts, Figure 1 represents in rear elevation a sewing-machine stand embodying my invention; Fig. 2, a section thereof on the dotted line $x$ of Fig. 1; Fig. 3, a detail showing the stand in section and one of the bearing-pieces to sustain the ball-like end of the shaft of the band-wheel, the said shaft being broken off; and Fig. 4 is a detail in cross-section of the ball-like end of the said shaft and its bearings and set-screw to hold the bearings in adjusted position.

The side pieces, A B, of the stand, of any usual shape, are connected by a suitable brace or cross-piece, C, screws $a$ holding the same together. The lower ends of the side pieces are joined, as usual, by the treadle-rod $c^2$. The band-wheel D is attached to the band-wheel shaft E, having, as herein shown, at one end a ball-like journal portion, $b$, (best shown separately and enlarged in Fig. 3, where is also shown one of the two halves $c$ of the divided bearing $c\ d$, shaped to receive and fit the said ball-like journal.) The two parts $c\ d$ of the said bearing are fitted into a suitable recess in the side piece, A, and are held in place by the set-screw $e$, which, as herein shown, bears against the outside of the part $d$ of the bearing, the part $d$, by its pressure against $c$, holding the latter in adjusted position. By moving the part $c\ d$ of the bearing longitudinally with relation to each other in reverse direction the said bearing may always be kept pressed firmly against the ball-like journal, and wear between the said parts may be readily compensated for. The said shaft near its opposite end, inside its attached crank $f$, is supported in a bearing, $g$, split from its front end backward past its center, as best shown at $g'$, Fig. 2, the said bearing having an adjusting-screw, $g^2$, by which to draw its upper and lower parts together to thus fit the shaft D, the latter, when inserted therein, fitting loosely. The ball-like journal $b$ enables the shaft D to be run smoothly and steadily, even though the bearings for the said shaft should be out of line. This ball-like journal obviates loss of time in fitting the shaft to its bearings. The treadle or foot-piece G is connected by link $h$ with the crank-pin $f'$ of the shaft D. The brace or cross-piece C has an attached dress-shield, $p$. Both sides of the bearing $g$ might be countersunk in line with its shaft-receiving opening to reduce the length of the bearing portion to aid in aligning the shaft E.

I claim—

1. The stand and its divided bearings $c\ d$, combined with the band-wheel shaft, provided at or near its end with a ball-like journal, and means to hold the said bearing portion in adjusted position, substantially as and for the purpose described.

2. The stand and its divided adjustable bearings $c$, $d$, and $g$, combined with the band-wheel shaft having a ball-like journal at one end, to operate substantially as described.

In testimony whereof I have signed my name to this specification in presence of two subscribing witnesses.

ROBERT WHITEHILL.

Witnesses:
G. W. GREGORY,
B. J. NOYES.